Jan. 5, 1960 W. C. PIERCE 2,919,776
MAGNETIC TORQUE PRODUCING DEVICE
Filed Dec. 1, 1955 3 Sheets-Sheet 3
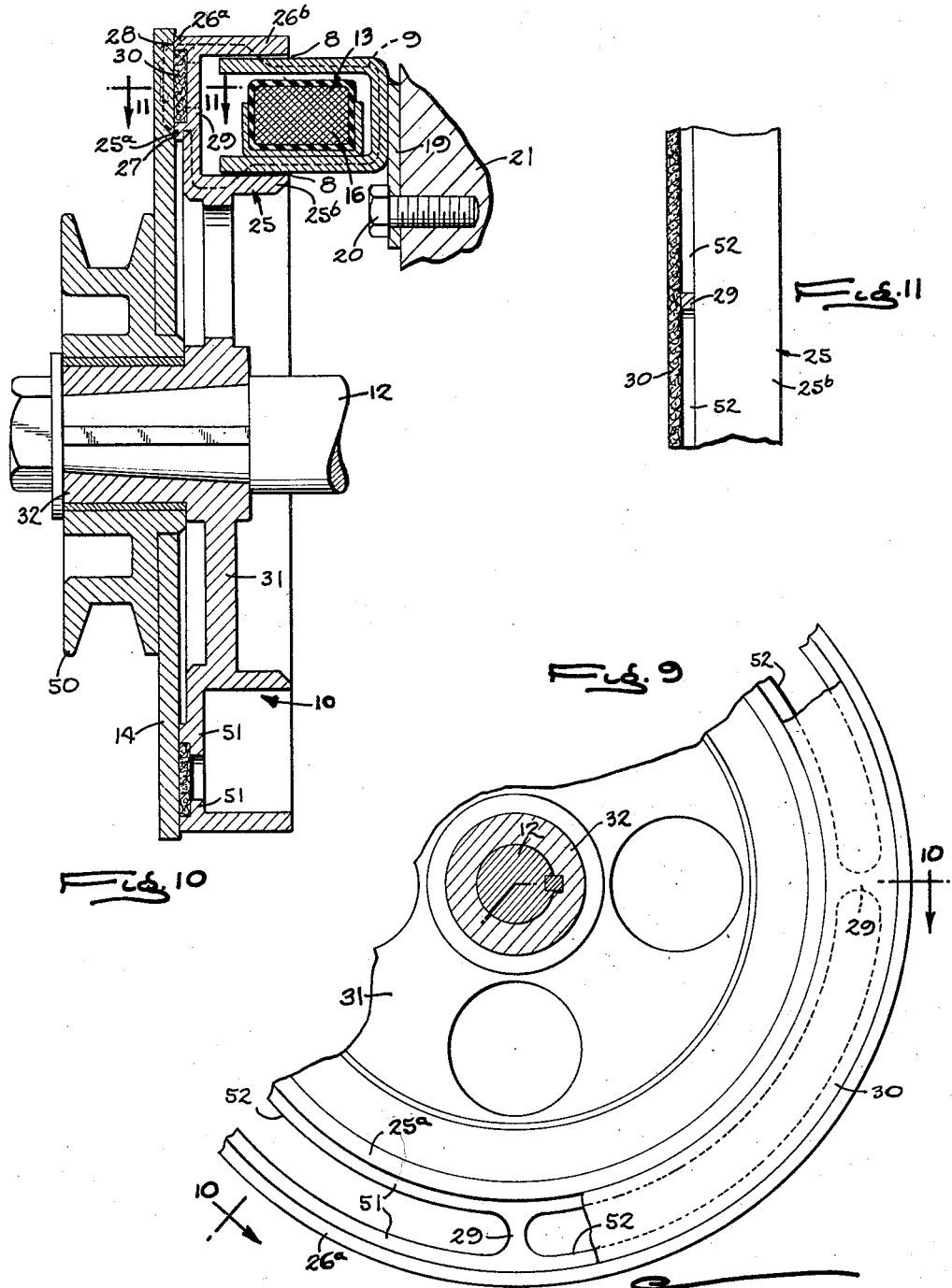
INVENTOR
William C. Pierce
By Carlson, Pitzner, Hubbard & Wolfe
ATTORNEY United States Patent Office 2,919,776
Patented Jan. 5, 1960

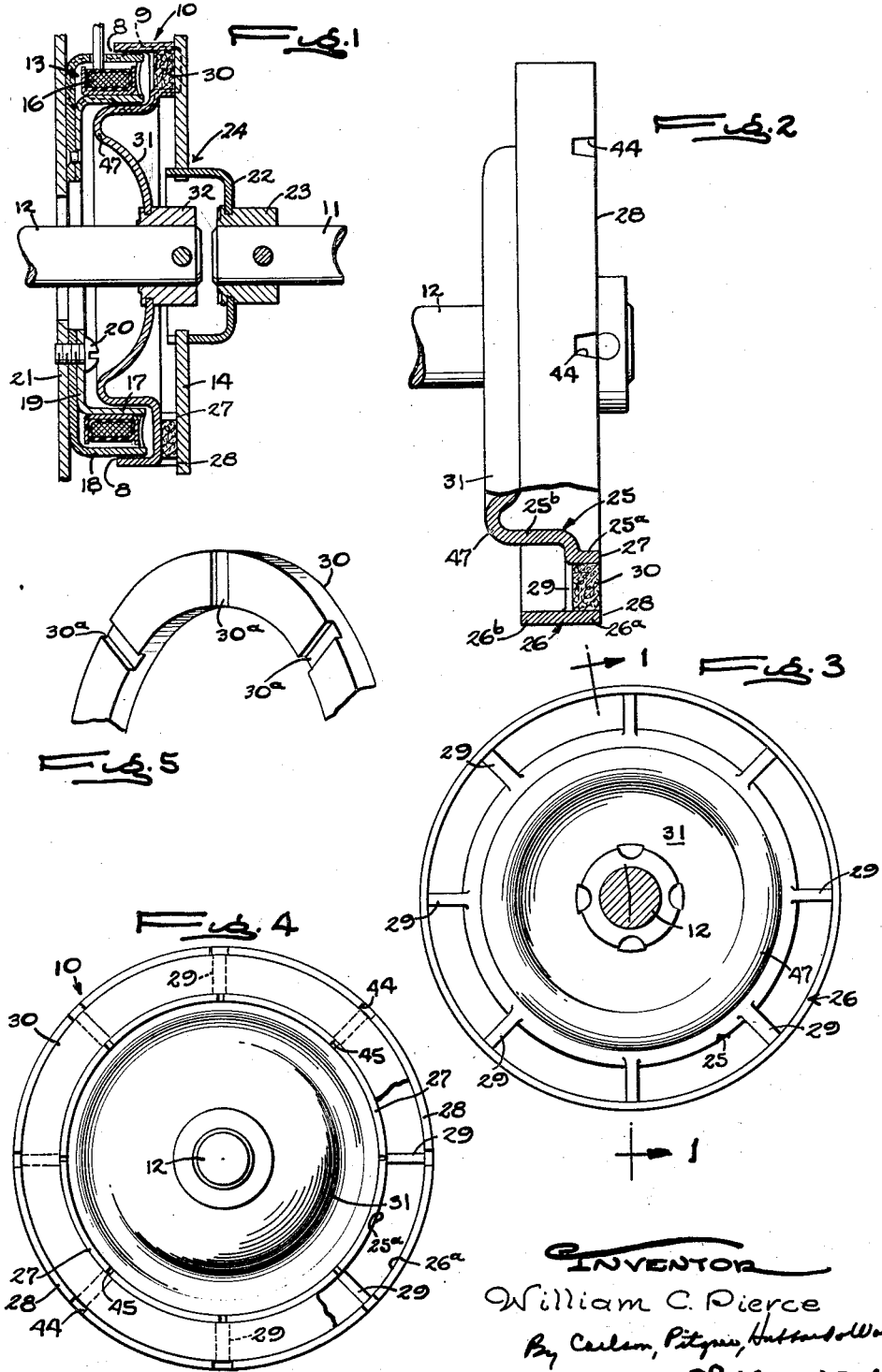

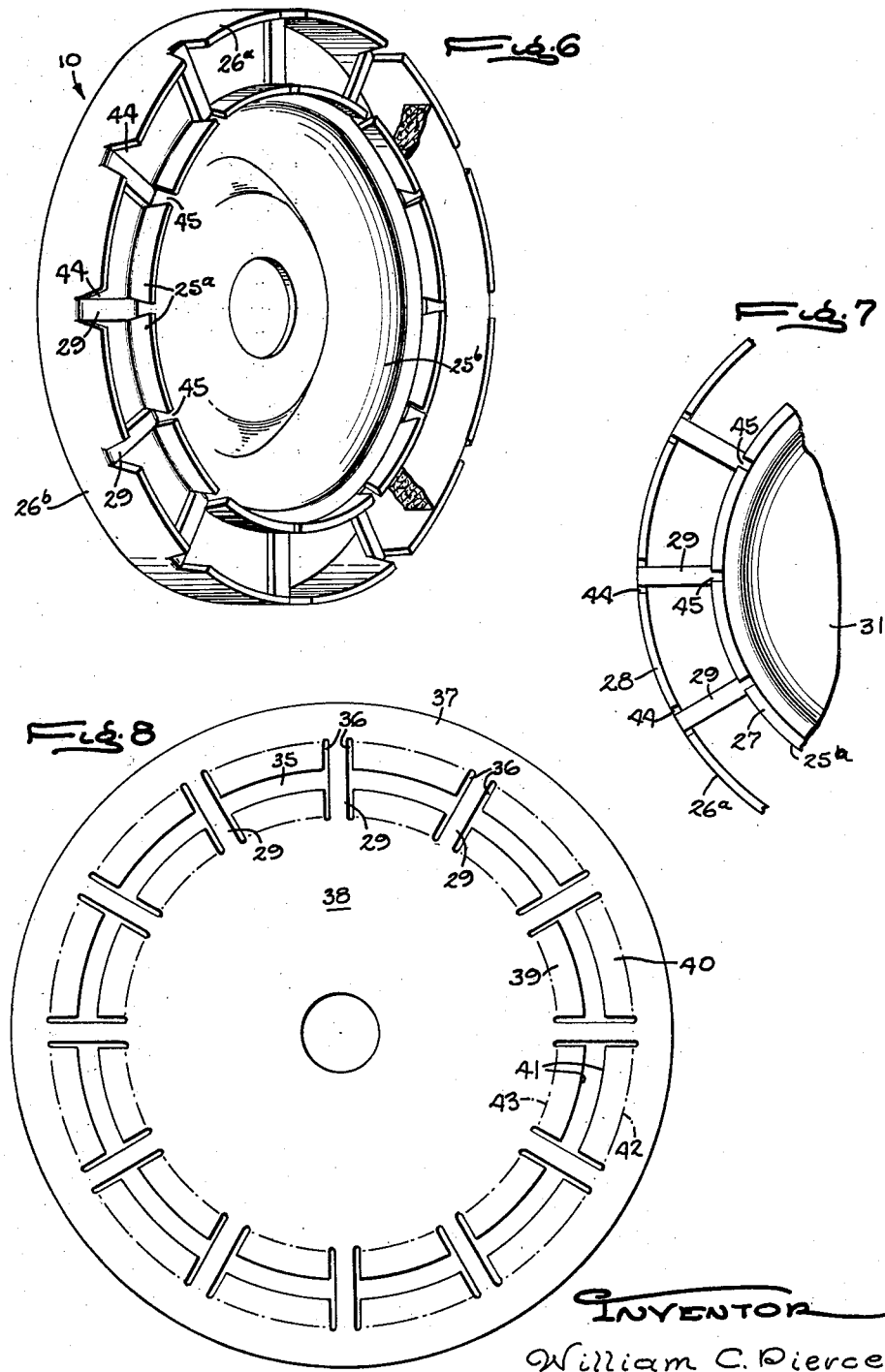

2,919,776

MAGNETIC TORQUE PRODUCING DEVICE

William C. Pierce, Beloit, Wis., assignor to Warner Electric Brake & Clutch Company, South Beloit, Ill., a corporation of Illinois Application December 1, 1955, Serial No. 550,282

11 Claims. (Cl. 192—84)

This invention relates to magnetically controlled clutches or brakes of the type in which magnetic flux for drawing the friction surfaces into gripping engagement threads a path of toroidal shape through concentric tubular pole rings which provide axially facing pole faces at one end and telescope at the other end with the poles of a magnet core, the rings being rigidly joined intermediate their ends but separated from each other magnetically. Heretofore such pole pieces have been constructed as separate parts and later joined by one or more spokes or connectors of nonmagnetic material.

The primary object of the present invention is to increase the rigidity and reduce the cost of manufacture of a pole ring assembly of the above character through the formation of the pole rings and the connectors therebetween as one integral piece.

The invention also resides in the novel construction of the pole piece connectors or spokes so as to avoid objectionable loss of the working flux through the friction surfaces.

A further object is to utilize the friction material between the pole faces in a novel manner to increase the rigidity of the assembled unit.

Another object is to provide a construction which permits the pole piece unit to be stamped from a single sheet of iron.

Still another object is to provide a sheet metal stamping of the above character which also provides a mounting flange integral with and supporting the entire pole ring assembly.

The invention further resides in the novel method of forming the one piece stamping.

Other objects and advantages of the invention will become apparent from the following detailed description taken in connection with the accompanying drawings, in which:

Figure 1 is a diametrical cross-sectional view of a magnetic friction clutch embodying the novel features of the present invention, the section being taken along the line 1—1 of Fig. 3.

Fig. 2 is an elevational view of the pole piece unit partially broken away and shown in diametrical section.

Figs. 3 and 4 are opposite end views of the unit shown in Fig. 2.

Fig. 5 is a perspective view of part of one of the friction segments.

Fig. 6 is a perspective view of the pole piece unit with part of the friction segments removed.

Fig. 7 is a fragmentary view similar to Fig. 4 with the friction segments removed.

Fig. 8 is a punched out sheet metal disk representing the first step in the formation of the unit shown in Fig. 6.

Fig. 9 is a fragmentary view similar to Fig. 4 showing a modified form of the pole piece unit.

Fig. 10 is a section taken along the line 10—10 of Fig. 9.

Fig. 11 is a fragmentary section taken along the line 11—11 of Fig. 10.

For purposes of illustration, the improved pole piece unit indicated generally at 10 is shown in the drawings incorporated in different forms (Figs. 1 to 7 and Figs. 9 to 11) of magnetic friction clutches for transmitting rotary power from one shaft 11 to another shaft 12. In each instance, the clutch comprises generally a stationarily mounted magnet 13 telescoping with one end portion of the pole piece unit 10 and an armature 14 adapted for axial gripping engagement with the other end of the pole unit. The core of the magnet, the pole unit 10, and the armature cooperate to form a toroidal flux path 9 (Figs. 1 and 10) threading back and forth between the friction faces of the armature and pole unit and including narrow radial gaps 8 between the telescoped parts of the magnet core and pole unit.

In each of the forms shown, the magnet 13 comprises a multiple turn annular winding 16 disposed within the magnet core which is of U-shaped cross section having concentric cylindrical pole members 17 and 18 and an inturned mounting flange 19. The latter is secured by screws 20 to a suitable stationary support for locating the pole members precisely concentric with the common axis of the shafts 11 and 12.

The armature 14 comprises a flat annulus which, in the form shown in Fig. 1, is coupled to the open end of a cup 22 fastened to a collar 23 on the shaft 11. Looseness between the parts of the coupling 24 allows some degree of tilting of the armature to permit of full face to face engagement between the armature and the opposed faces 27 and 28 of the pole unit 10.

This unit comprises a single integral magnetic member providing radially spaced concentric tubular pole pieces $25^a$ and $26^a$ terminating in axially facing pole faces 27 and 28 and, in accordance with the present invention, integrally connected by spokes 29 of the same material angularly spaced around the pole unit and having a combined cross-section which is a small fraction of the area of the pole faces. In the present instance, the pole pieces $25^a$ and $26^a$ comprise the end portions of two cylindrical rings 25 and 26 having opposite end portions $25^b$ and $26^b$ which telescope closely with the core members 17 and 18. Although the spokes or connectors 29 are composed of magnetic material and are integral at opposite ends with the pole pieces $25^a$ and $26^a$, they are constructed and arranged in a novel manner to avoid objectionable by-passing of the magnetic flux across the toroidal path above referred to. By making the spokes integral with the pole rings, all of the parts of the pole unit may be formed in a single piece thus providing the desired rigidity of the pole ring connection and reduced cost of manufacture of the unit 10 as a whole.

The pole projections $25^a$ and $26^a$ define between them an annular groove which is filled with rigid nonmagnetic friction material 30 presenting a flat face flush with the pole faces 27 and 28. Preferably this material 30 is molded or otherwise shaped to form segments which fit closely within the pole groove and are secured rigidly therein by a suitable cement. The thickness of the segments correspond to the axial spacing of the pole faces from the spokes 29 which thus forms a rigid backing for the friction material. If desired grooves $30^a$ may be molded in the back of the segments 30 as shown in Fig. 5, these being sized to receive the spokes 29 and thus become interlocked therewith to hold the segments positively against shifting relative to the pole piece unit.

The pole unit 10 is mounted on the shaft 12 through the medium of an inturned flange 31 which is also formed integral wtih the inner pole ring 25. The inner periphery of this flange is rigid with a hub 32 suitably keyed to the shaft. By such mounting and with the pole and core rings properly sized relative to each other, the radial gaps 8 may be maintained of a uniform and very narrow width.

In the form shown in Figs 1 to 8, the pole unit 10 is a sheet metal stamping formed from a single disk of magnetic iron of uniform thickness. The disk is punched out as shown in Fig. 7 to remove material from angularly spaced sectors radially spaced inwardly from the outer periphery of the disk leaving arcuate slots 35 of uniform width communicating at opposite ends with the centers of radial slots 36 of narrower width extending both outwardly and inwardly to the ends of the spokes 29. The continuity of the inner and outer portions or rims 37 and 38 of the disk is preserved and these portions are left integrally connected by the spokes 29 that separate the adjacent slots 36. The latter thus divide the intervening metal into inner and outer arcuate bands 39 and 40 whose free edges 41 are concentric with each other and with the disk axis.

The disk thus perforated is then placed between suitably contoured forming dies adapted when forced together under pressure to bend the bands 39 and 40 about lines 42 and 43 through a quarter of a revolution and to one side of the disk thus converting the bands into the concentric arcuate projections 25$^a$ and 26$^a$ above described. The outer projections 26$^a$ are thus arranged in a circular row (see Figs. 4 and 6) with the adjacent ends separated by notches 44, the bottoms of which are formed by the outer ends of spokes 29. The side walls of each notch diverge axially as shown in Figs. 2 and 6 owing to the formation of the notch by bending the adjacent bands 40 outwardly about their outer edges 42. The inner pole projections 25$^a$ are similarly arranged in a circular row and separated by axially opening notches 45 which, being formed by bending of the bands 39 about the arc 43 of smaller diameter, converge axially and are of correspondingly lesser circumferential width at their open ends. These differences in the width of the notches 44 and 45 substantially compensate for the difference in the diameters of the two annular rows of pole projections 25$^a$ and 26$^a$ so that, with the projections of the same radial thickness, the combined area of their faces forming the inner pole face 27 is substantially equal to the combined area of the end faces of the pole projections forming the outer pole face 28. In this way, the forces attracting the inner and outer edge portions of the armature 14 for a given density of flux threading the toroidal path 9 are substantially equalized as is desirable in order to promote uniform wearing off of the friction surfaces in service use of the clutch.

Simultaneous with the bending of the pole projections 25$^a$ and 26$^a$ the inner and outer peripheries or rim portions 37 and 38 of the punched out disk are bent toward the opposite side of the spokes 29 and through a quarter revolution about the same lines 42 and 43 of bending. These continuous portions of the disk are thus converted into concentric cylinders 25$^b$ and 26$^b$ in substantial alinement with the pole pieces 25$^a$ and 26$^a$ on the other side of the spokes 29.

After drawing of the punched out disks to the form shown in Fig. 6, the segments of the friction material 30 are coated with a suitable cement and pressed in between the pole projections 25$^a$ and 26$^a$ thus filling the space between the pole faces down to the spokes 29 which form a rigid backing for supporting the segments and maintaining their surfaces flush with the pole faces. The rigidity of the connection may be increased as above described by notching the segments radially to form the grooves 45 (Fig. 6) that snugly receive the spokes 29.

The flange 31 for supporting the pole unit 10 is formed during shaping of the inner pole piece 25$^b$ by substantially maintaining the original position of the inner periphery of the disk and depressing the intermediate portion as indicated at 47 (Fig. 1) to a depth determined by the desired axial length of the inner pole ring 25. The original disk is apertured at its center and later pressed onto the collar 32 and secured to the latter as by suitable staking.

For certain applications, particularly in clutches of larger diameter, it may be preferred to form the pole unit 10 as a casting, later machined to provide the desired final shape. Such a modification is shown in Figs. 9 to 11 in which the armature 14 is secured to a pulley 50 journaled on the hub 32 of the mounting flange 31 of the pole unit. The latter flange is substantially flat and joined to the pole ring 25 intermediate the ends of the latter which, in this instance, is made of L-shaped cross section with the pole projection 25$^a$ comprising a short flange near the short leg of the L. As before, the outer pole projection 26$^a$ is axially alined with the cylindrical end 26$^b$ of the outer pole ring.

In this instance, the spokes 29 integrally joining the inner and outer pole rings are part of a web 51 which is disposed in a transaxial plane spaced from the pole faces 27 and 28 a distance corresponding to the desired thickness of the friction segments 30, the web thus forming a rigid backing for these segments. The web is interrupted by circumferentially elongated slots 52 which are of substantial radial width and are separated at adjacent ends according to the desired width of the spokes 29 at their narrowest cross section.

In each of the forms above described, the spokes 29 of the pole unit 10 extend across the toroidal flux path 9 and thus by-pass some of the available flux around the working faces of the poles and armature. By properly correlating the spoke sections with the other parts of the circuit and with the coil 16, it is possible to maintain the desired high flux density in the pole faces 27 and 28 while at the same time maintaining proper rigidity of the integral connection of the pole rings 26 and 27 by the spokes 29. In the form shown in Figs. 1 to 7 where all of the parts of the unit 10 are of uniform thickness, the flux created by energization of the coil 16 saturates the pole piece ends 25$^b$ and 26$^b$. Part of this flux is by-passed through the spokes 29 to the point of saturation of the latter, the remaining flux threading the pole projections 25$^a$ and 26$^a$ and the armature 14. The amount of this working flux is sufficient to saturate the pole faces 27 and 28 owing to the reduction in the areas of these faces resulting from the presence of the notches 44 and 45 and the manner of forming the integral pole connections or spokes 29. With the cast pole unit shown in Figs. 9 to 11, the thickness of the pole rings 25 and 26 in relation to the areas of the pole faces 27 and 28 and the spoke cross sections may be varied so as to produce the desired flux saturation at both of the pole faces and in the spokes.

The mounting of the friction segments in the manner above described contributes appreciably to the rigidity of the connection provided by the spokes 29. This is because the segments are of substantial thickness, firmly backed and interlocked with the spokes, and composed of material which, when cemented properly between the pole projections 25$^a$ and 25$^b$ provides a solid and externally rigid mass completely filling the groove between these projections.

The subject matter common to the disclosures of this application and Robert C. Walter application Ser. No. 740,848 is claimed generically in this application to which the Walter application is subordinate.

I claim as my invention:

1. A pole piece unit of the character described composed of a single integral sheet of iron of uniform thickness and comprising integrally connected parts including inner and outer tubular rings concentric with a common axis and having pole faces at one of their ends lying in a common transaxial plane, and flat spokes paralleling said plane and rigidly joining said rings intermediate their ends at points angularly spaced apart around said axis, the pole face ends of said rings being divided into a plurality of arcs separated from each other by notches opening axially and having bottoms defined by the respective ones of said spokes.

2. A unit as defined by claim 1 in which the gaps between said arcs of the outer ring are wider circumferentially than the gaps separating the arcs of the inner ring.

3. A unit as defined by claim 1 in which the side edges of the notches in the outer ring converge while the edges of the notches in the inner ring diverge toward the associated spoke.

4. A unit as defined by claim 1 in which said notches in the outer ring are wider than the associated spoke and the notches in the inner ring are narrower than such spoke.

5. A pole piece unit of the character described composed of a single integral sheet of iron and comprising integrally connected parts including concentric inner and outer tubular rings having pole faces at one of their ends ends lying in a common transaxial plane, and spokes rigidly joining said rings and angularly spaced apart around said axis, the pole face ends of said rings being divided into a plurality of arcs separated from each other by notches lying in the radial planes of said spokes.

6. A pole piece unit as defined in claim 5 having non-magnetic filling material seated between said pole pieces and backed by said spokes and providing a solid rigid connection between the pole pieces.

7. A pole unit as defined in claim 5 having a rigid filling of nonmagnetic friction material spanning said pole pieces and backed by said spokes, said filling having notches therein interlocked with said spokes.

8. In a magnetic friction torque producing device, the combination of, two inner and outer tubular rings concentric with a common axis and terminating at one end in pole faces radially spaced apart and adapted for axial gripping engagement with an opposed coacting friction element, spokes angularly spaced apart around said rings and rigidly joining the latter to form a rigid pole unit, said spokes being spaced axially from said pole faces and being integral at opposite ends with said inner and outer rings so as to form with the latter a single integral piece pole unit of magnetic material, a magnet having an annular core of U-shaped cross-section telescoping with said inner and outer rings and coacting with said pole unit to form a flux circuit of toroidal shape encircling said spokes and extending axially in opposite directions along each radial section of said rings and out of one of said pole faces and back into the other face, said spokes being separated circumferentially from each other by segments of a non-magnetic medium and the combined circumferential areas of the spokes at their narrowest cross-sections being a small fraction of the cross-section of either of said pole faces whereby the spokes provide connections of high reluctance to prevent substantial by-passing of the available flux radially across said flux circuit and around said pole faces.

9. A friction coupling as defined in claim 8 in which the axial thickness of said spokes is substantially equal to the radial thickness of said pole rings.

10. In a magnetic friction coupling, the combination of, a single integral piece of magnetic material shaped to provide concentric tubular rings and angularly spaced spokes rigidly joining said rings and integral at opposite ends with the adjacent peripheries of the rings, said rings terminating at one end in annular pole faces lying in a common transaxial plane and said spokes being disposed intermediate the ends of said rings and axially spaced from said pole faces whereby said rings and spokes define an axially opening groove between the pole faces, and a rigid body of non-magnetic material seated in said groove and providing a rigidly backed friction face flush with said pole faces and held against angular displacement in said groove, the combined circumferential area of said spokes at their narrowest cross-section being a small fraction of the area of either of said pole faces, and said non-magnetic body projecting axially into the segmental spaces between the adjacent ones of said spokes and interlocking with the latter.

11. A magnetic friction coupling as defined in claim 8 in which the magnetic flux resulting from energization of said magnet saturates said spokes at said narrowest cross-section and also substantially saturates the entire areas of each of said pole faces.

References Cited in the file of this patent

UNITED STATES PATENTS

| | | |
|---|---|---|
| 1,254,664 | Downes et al. | Jan. 29, 1918 |
| 1,446,225 | Thompson | Feb. 20, 1923 |
| 1,915,793 | Lane | June 27, 1933 |
| 1,936,240 | Lane | Nov. 21, 1933 |
| 2,653,376 | Fletcher et al. | Sept. 29, 1953 |
| 2,674,359 | Rostu | Apr. 6, 1954 |
| 2,739,684 | Meyer | Mar. 27, 1956 |